(12) United States Patent
Eng (10) Patent No.: US 7,649,536 B1
(45) Date of Patent: Jan. 19, 2010

(54) SYSTEM, METHOD, AND COMPUTER PROGRAM PRODUCT FOR UTILIZING NATURAL MOTIONS OF A USER TO DISPLAY INTUITIVELY CORRELATED REACTIONS

(75) Inventor: David Lee Eng, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 421 days.

(21) Appl. No.: 11/454,547

(22) Filed: Jun. 16, 2006

(51) Int. Cl.
*G06T 13/00* (2006.01)
*G06T 15/70* (2006.01)

(52) U.S. Cl. ................................... 345/474
(58) Field of Classification Search ............. 345/474
See application file for complete search history.

(56) References Cited

U.S. PATENT DOCUMENTS

| | | | | |
|---|---|---|---|---|
| 4,028,725 A * | 6/1977 | Lewis | ........................ | 348/115 |
| 4,595,990 A * | 6/1986 | Garwin et al. | ............... | 708/141 |
| 5,094,521 A * | 3/1992 | Jolson et al. | ................. | 351/210 |
| 5,588,139 A * | 12/1996 | Lanier et al. | ................... | 703/1 |
| 5,751,260 A * | 5/1998 | Nappi et al. | .................. | 345/8 |
| 5,850,211 A * | 12/1998 | Tognazzini | ................. | 345/158 |
| 5,936,367 A * | 8/1999 | Takenaka | ................ | 318/568.12 |
| 6,261,239 B1 * | 7/2001 | Abraham-Fuchs et al. | .. | 600/558 |
| 6,381,339 B1 * | 4/2002 | Brown et al. | ................. | 382/100 |
| 6,441,770 B2 * | 8/2002 | Russell | ........................ | 341/176 |
| 6,734,845 B1 * | 5/2004 | Nielsen et al. | .............. | 345/211 |
| 6,937,272 B1 * | 8/2005 | Dance | ...................... | 348/208.2 |
| 7,315,324 B2 * | 1/2008 | Cleveland et al. | ......... | 348/208.4 |
| 7,406,386 B2 * | 7/2008 | Brett et al. | ..................... | 702/41 |
| 2001/0000433 A1 * | 4/2001 | Russell | ........................ | 341/20 |
| 2002/0050983 A1 * | 5/2002 | Liu et al. | ..................... | 345/173 |
| 2003/0176960 A1 * | 9/2003 | Yamamura | ................... | 701/36 |
| 2004/0140954 A1 * | 7/2004 | Faeth | .......................... | 345/163 |
| 2006/0217945 A1 * | 9/2006 | Leprevost | ....................... | 703/2 |
| 2006/0239670 A1 * | 10/2006 | Cleveland | .................... | 396/51 |
| 2007/0013722 A1 * | 1/2007 | Souza | ........................ | 345/660 |
| 2007/0061038 A1 * | 3/2007 | Takenaka et al. | ............ | 700/245 |
| 2007/0085853 A1 * | 4/2007 | Smith et al. | ................. | 345/581 |
| 2007/0192045 A1 * | 8/2007 | Brett et al. | ..................... | 702/42 |

OTHER PUBLICATIONS

Jason S. Babcock, Jeff B. Pelz; Building a lightweight eyetracking headgear ETRA '04: Proceedings of the 2004 symposium on Eye tracking research & applications; Mar. 2004, ACM.*

(Continued)

*Primary Examiner*—Javid A Amini
(74) *Attorney, Agent, or Firm*—Zilka-Kotab, PC (57) ABSTRACT

A system, method, and computer program product are provided for utilizing natural motions of a user to display intuitively correlated reactions. In use, an application-independent command is received from an input device utilizing at least one natural motion of a user with an associated degree. In response to the application-independent command, a reaction is displayed on a display in a manner that is intuitively correlated with the at least one natural motion. Further, a degree of the reaction is a function of the degree of the at least one natural motion.

17 Claims, 5 Drawing Sheets

OTHER PUBLICATIONS

Papier-Mache: toolkit support for tangible input Scott R. Klemmer, Jack Li, James Lin, James A. Landay Apr. 2004 CHI '04: Proceedings of the SIGCHI conference on Human factors in computing systems Publisher: ACM.*

GWindows: robust stereo vision for gesture-based control of windows Andrew Wilson, Nuria Oliver Nov. 2003.*

Phillips, JG et al., "A Kinematic Analysis of Computer Mouse Movements", Psychology Department, Monash University, Clayton VIC 3168, Australia.

Opera Software, http://www.opera.com.

Avid Solutions, http://www.avid.com.

Softimage, http://www.softimage.com.

NVIDIA ForceWare 55 Hands-On, HotHardware.com.

Hilbert et al., "Extracting Usability Information from User Interface Events," ACM Computing Surveys, vol. 32, No. 4, Dec. 2000, pp. 384-421.

* cited by examiner

SYSTEM, METHOD, AND COMPUTER PROGRAM PRODUCT FOR UTILIZING NATURAL MOTIONS OF A USER TO DISPLAY INTUITIVELY CORRELATED REACTIONS

FIELD OF THE INVENTION

The present invention relates to computer input devices, and more particularly to using computer input devices for control purposes.

BACKGROUND

Many of the tasks that a user must perform when using a computer relate to various spatial relationships between objects. For example, such tasks may involve moving, adding, deleting, instantiating, minimizing, etc. an object. Typical user interfaces require a user to perform the same kind of standardized input operations for all tasks, such as clicking a button, selecting an item from a menu, etc. While this framework may be useful to make a variety of tasks accessible by way of a few familiar input operations, it also forces the user to abstract their task into a general input operation.

For example, if the user has to click a button to move an application from a main workspace (e.g. desktop, etc.) to the bottom of an associated graphical user interface (e.g. taskbar, etc.) where they can quickly track all tasks, the user is forced to abstract such a task to something triggered by a button that is counterintuitive or unrelated, at best. Thus, if the user's initial concept of the foregoing task equates to pushing the application downwards, they must spend the time and mental energy to put aside such a notion and think about pushing a button, etc. This type of abstraction can potentially adversely affect a user's experience as well as their productivity and/or efficiency.

There is thus a need for overcoming these and/or other problems associated with the prior art.

SUMMARY

A system, method, and computer program product are provided for utilizing natural motions of a user to display intuitively correlated reactions. In use, an application-independent command is received from an input device utilizing at least one natural motion of a user with an associated degree. In response to the application-independent command, a reaction is displayed on a display in a manner that is intuitively correlated with the at least one natural motion. Further, a degree of the reaction is a function of the degree of the at least one natural motion.

DETAILED DESCRIPTION

Figure 1:
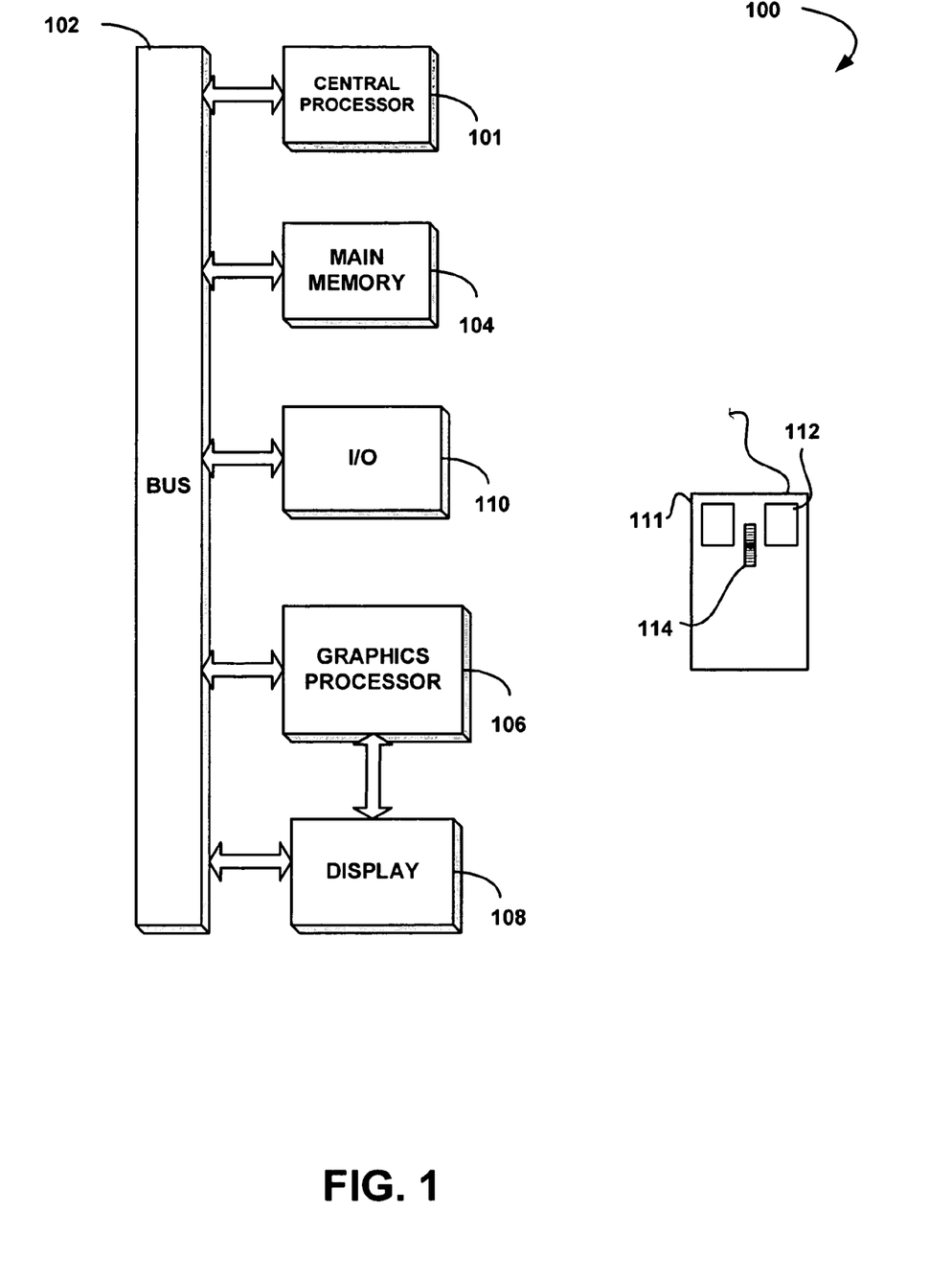
FIG. 1 illustrates an exemplary computer system in which the various architecture and/or functionality of some embodiments may be implemented.

FIG. 1 illustrates an exemplary computer system 100 in which the various architecture and/or functionality of some embodiments may be implemented. As shown, the computer system 100 is provided with at least one host processor 101 which is connected to a communication bus 102. The computer system 100 also includes a main memory 104. Control logic (software) and data are stored in the main memory 104 which may take the form of random access memory (RAM).

The computer system 100 also includes a graphics processor 106 and a display 108 (e.g. a computer monitor, flat panel display, CRT display, etc.). While only one display is shown in FIG. 1, it should be noted that multiple-display embodiments are also contemplated. More information regarding such environment will be set forth hereinafter in greater detail.

In one embodiment, the graphics processor 106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 100 may also include a secondary storage (not shown). Such secondary storage may include, for example, a hard disk drive and/or a removable storage drive, representing a floppy disk drive, a magnetic tape drive, a compact disk drive, etc. The removable storage drive reads from and/or writes to a removable storage unit during use.

Further provided are one or more input/output (I/O) devices 110. For example, as shown in FIG. 1, a mouse 111 may be included for providing input commands. To facilitate such, the mouse 111 may include one or more buttons 112 and/or a track wheel 114 located proximal to the buttons 112 for rotating about a laterally-disposed horizontal axis. While not shown, the mouse 111 may be capable of further input by way of a movement tracking mechanism (e.g. a ball, laser tracker, etc.) for tracking movement of the mouse 111 in an X-Y plane.

Of course, the mouse 111 may communicate with the bus 102 by way of any hard-line or wireless interface. Further, while a traditional mouse is shown in FIG. 1, it should be noted that the I/O devices 110 may include a trackball, joystick, touch window, touch screen, digitizing tablet, touch pad, head pointer, mouse key, eye gazer, eye tracker, and/or any other desired type of input device may be used per the desires of the user.

For control purposes, computer programs, or computer control logic algorithms, may be stored in the main memory 104 and/or secondary storage. Such computer programs, when executed, enable the computer system 100 to perform various functions. For example, a driver (not illustrated) may be provided for allowing various input devices such as the mouse 111 to interface with other components of the computer system 100 in a desired manner. It should be noted that memory 104 and/or any other storage (e.g. the aforementioned secondary storage, etc.) are possible examples of computer-readable media.

In one embodiment, the architecture and/or functionality of the various following figures may be implemented in the context of the host processor 101, graphics processor 106, a chipset (i.e. a group of integrated circuits designed to work and sold as a unit for performing related functions, etc.), and/or any other integrated circuit for that matter.

Still yet, the architecture and/or functionality of the various following figures may be implemented in the context of a general computer system, a circuit board system, a game console system dedicated for entertainment purposes, an application-specific system, and/or any other desired system.

Figure 2:
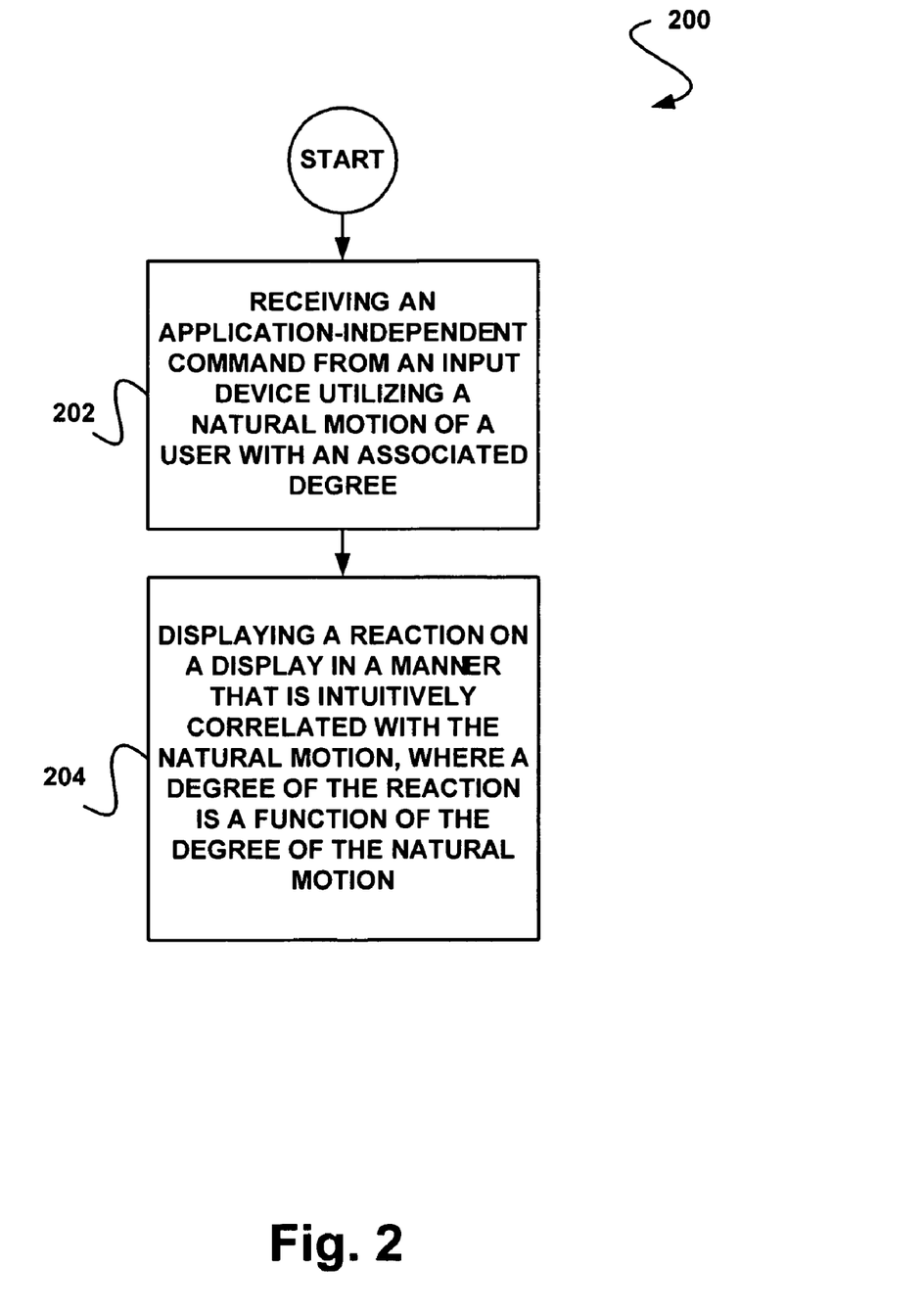
FIG. 2 shows a method for utilizing natural motions of a user to display an intuitively correlated reaction, in accordance with one embodiment.

FIG. 2 shows a method 200 for utilizing natural motions of a user to display an intuitively correlated reaction, in accordance with one embodiment. As an option, the present method 200 may be implemented to perform the associated operations in the context of the computer system 100 of FIG. 1. Of course, however, the method 200 may be implemented in any desired environment.

As shown, an application-independent command is received from an input device (e.g. see, for example, input device(s) 110 of FIG. 1, etc.) utilizing at least one natural motion of a user with an associated degree. See operation 202. In the context of the present description, the term application-independent refers to the fact that the command is independent of any one application and, instead, may be applied in a consistent manner across multiple different applications. For example, in one optional embodiment, the command may be defined by or for an operating system, such that the command may be may be applied in a consistent manner across all applications executed by the operating system. Further, in such an embodiment, the command may be received and used when no applications are running (e.g. in conjunction with a user desktop, a graphic user interface associated with an operating system, etc.).

Still yet, as will become apparent, the natural motion may include any motion that is intuitively correlated with a desired reaction. In one optional embodiment, the natural motion may be manifested on the display utilizing a cursor. To this end, in such particular embodiment, the natural motion may be visually monitored in part or in full, when performed, by inspection of the cursor.

Further, in the context of the present description, the associated degree may refer to an extent to which any parameter associated with the natural motion is performed. Just by way of example, the degree may be associated with a parameter such as speed, length, size, smoothness, intensity, number, and/or any other parameter, for that matter.

In response to the application-independent command, a reaction is displayed on a display (e.g. see, for example, display 108 of FIG. 1, etc.). In the context of the present description, the reaction may refer to any action (other than or beyond a sole cursor movement correlating with the natural motion), that is taken in response to the command, and is capable of having at least one aspect that has a displayed manifestation. As shown in operation 204, such reaction is further displayed in a manner that is intuitively correlated with the at least one natural motion.

Further, a degree of the reaction is a function of the degree of the natural motion. See, again, operation 204. In one optional embodiment, such function may be a direct relationship, such that an increase in a degree associated with the natural motion results in a corresponding increase in a degree of the reaction. Of course, other functions are also contemplated.

To this end, a user may use natural motions in an application-independent manner for generating reactions that are intuitively correlated with such natural motions and further have a degree that is a function of a degree of the natural motion.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
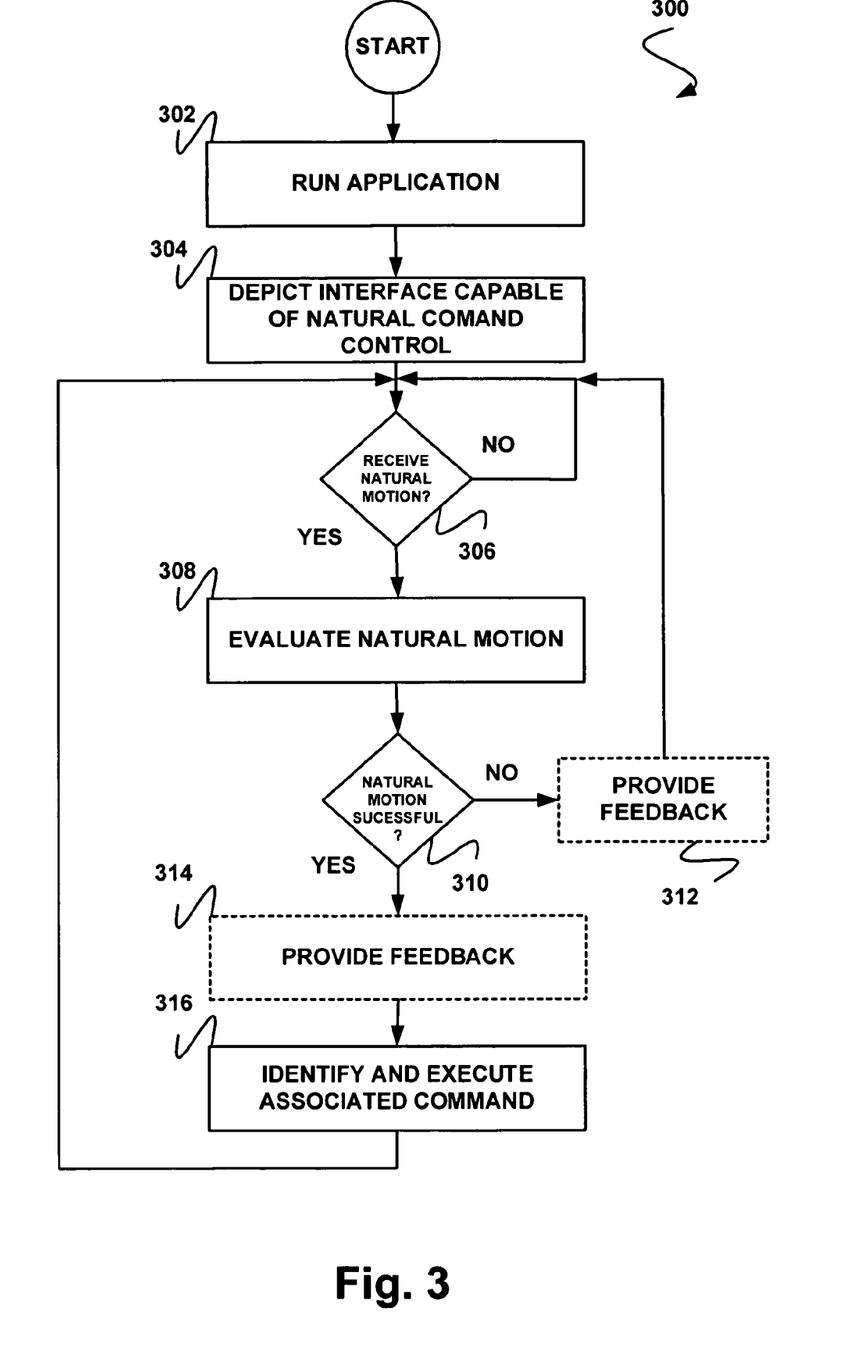
FIG. 3 shows a method for utilizing natural motions of a user to display an intuitively correlated reaction, in accordance with another embodiment.

FIG. 3 shows a method 300 for utilizing natural motions of a user to display an intuitively correlated reaction, in accordance with another embodiment. As an option, the present method 300 may be implemented to perform the associated operations in the context of the computer system 100 of FIG. 1 as well as the method 200 of FIG. 2. Of course, however, the method 300 may be implemented in any desired environment. Still yet, the above definitions may equally apply to the present description.

As shown, one or more applications may be run in operation 302. Such application may include any application capable of handling commands that result from natural motions. As mentioned earlier, however, it is contemplated that, in one embodiment, no application(s) need be running, such that the present method 300 may simply be used with an operating system.

In operation 304, an interface is provided that is capable of receiving commands such as those described earlier during reference to operation 202 of FIG. 2. In other words, the interface may be configured to recognize such commands as well as provide for the associated reaction, degree, etc. If such an interface is depicted, the method 300 polls for such a natural motion that may potentially be indicative of an associated command. See decision 306.

Upon receipt of a natural motion per decision 306, such motion is evaluated in operation 308. Such evaluation may involve any logic that is capable of determining a likelihood as to whether the natural motion of decision 306 successfully correlates with a command based on the evaluation. Such correlation may be gauged by evaluating various aspects associated with the natural motion including, but not limited to a context (e.g. window, etc.) in which the natural motion was received, various parameters (e.g. type, shape, or X/Y-direction of motion, etc.).

Table 1 illustrates an exemplary data structure which may be used during the course of the evaluation of operation 308. Of course, it should be noted such data structure is set forth for illustrative purposes only and should not be construed as limiting in any manner. To this end, the evaluation may be effected in any desired manner.

TABLE 1

| | |
|---|---|
| Natural_motion_1 (Context_1, Parameter 1, Parameter 2) | Command_1 |
| Natural_motion_2 (Context_1, Parameter 3, Parameter 4) | Command_2 |
| Natural_motion_3 (Context_2, Parameter 5, Parameter 6) | Command_3 |
| Natural_motion_4 (Context_2, Parameter 7, Parameter 8) | Command_4 |

Thus, in use, the context and parameters of the natural motion from decision 306 may be compared to those known in Table 1. In one embodiment, there may be one or more thresholds of similarity (e.g. <X % difference between parameters, same context, etc.) which, if met, triggers a successful comparison. See the determination of decision 310. Again, any evaluation that results in the identification of a natural motion that correlates with a known command may be used.

Strictly as an option, the user may be provided with feedback regarding the natural motion identified. As indicated in operations 312 and 314, such feedback may be provided irrespective as to whether the motion was deemed successfully correlated per decision 310. In various embodiments, the feedback may take the form of a query to confirm a successfully correlated command or a potentially correlated command for confirmation purposes. In other embodiments, potentially correlated commands may be listed for selection by the user.

As indicated in operation 316, any successfully correlated command may be received from the evaluation logic for the purpose of executing the same. Such conditional execution may, in turn, result in a displayed reaction similar to that set forth during reference to operation 204 of FIG. 2. Thereafter, the method 300 continues polling for additional commands per decision 306.

It should be noted that the logic which evaluates the natural motions for control purposes may be trained, in some optional embodiments. Specifically, such training may be configured for improving the successful identification of natural motions and/or correlation thereof with known commands.

In one embodiment, the training may be based on user input. For example, at boot-up or any other time during use, a sensitivity of the evaluation logic may be set by the user. Such sensitivity may, for instance, control the aforementioned threshold (e.g. percentage, etc.) set forth hereinabove during reference to Table 1. Further, the user may enter whitelist or blacklist input which indicates that predetermined natural motions do or do not result in a correlation with a command, respectively. Still yet, input may be provided for correlating predetermined natural motions with predetermined reactions in a user-configured manner. For example, the user may be provided with the ability to configure a mapping between the natural motions and commands (and associated reactions) set forth in Table 1.

In yet another training embodiment, the training may be automatically performed by determining whether the user attempts to undo the reaction. Specifically, if it is found, after operation 316, that a user attempts to undo the reaction/command that was prompted by a correlation with a received natural motion, it may be learned that such nature motion was not intended to elicit the reaction. To this end, such specific natural motion may be "blacklisted" to prevent any further correlation with the reaction/command that was undone.

More information will now be set for regarding various exemplary natural motions and associated commands for generating reactions that are intuitively correlated with such natural motions and further have a degree that is a function of a degree of the natural motion. Again, such examples are set forth for illustrative purposes only and should not be construed as limiting in any manner whatsoever.

Figure 4:
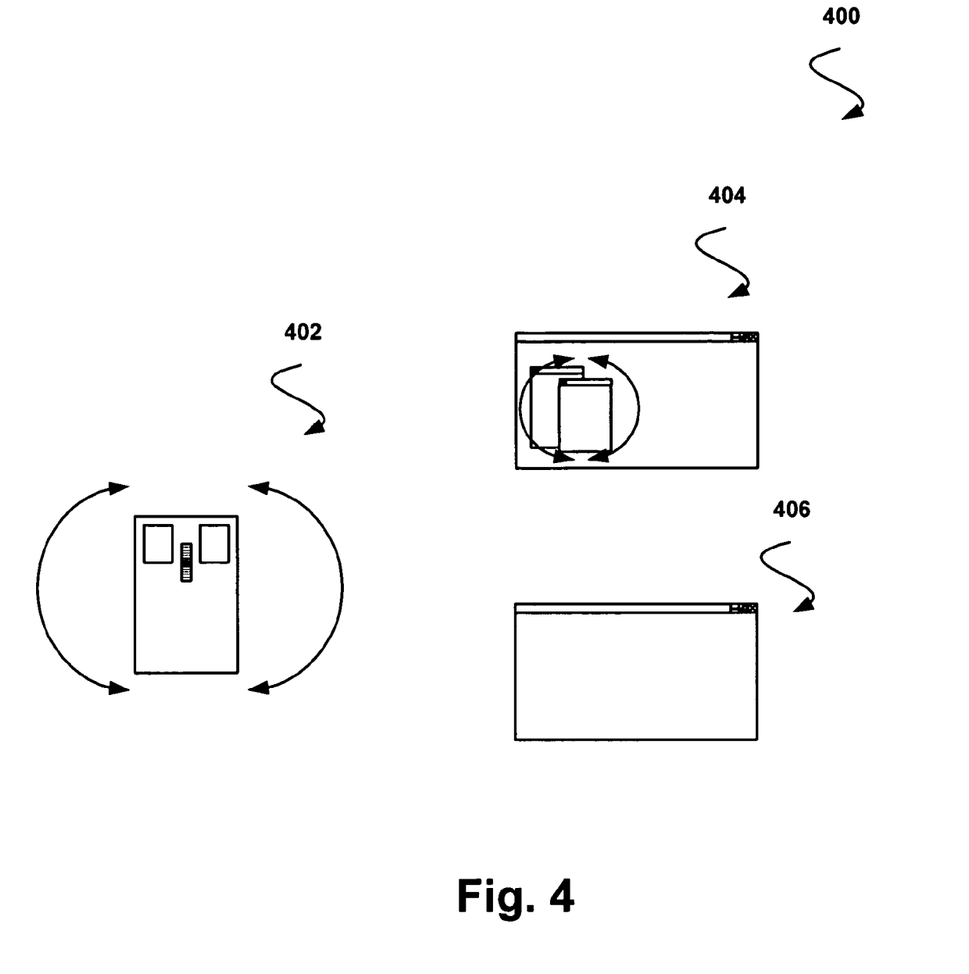
FIG. 4 shows a natural motion and reaction combination for utilizing natural motions of a user to clear a screen, in accordance with one embodiment.

FIG. 4 shows a natural motion and reaction combination 400 for utilizing natural motions of a user to clear a screen, in accordance with one embodiment. As an option, the present natural motion and reaction combination 400 may be implemented in the context of the architecture and functionality of FIGS. 1-3 or in any desired environment, for that matter.

As shown, the natural motion includes a circular movement 402 indicative of an erasing function. Further, the reaction involves erasing a portion of a graphical user interface subject to the circular movement. Note a first instance of the graphical user interface 404 showing a cursor movement correlating with the circular movement 402 of the mouse, as well as a second instance of the graphical user interface 406 showing a result of such natural motion. Thus, when the user wants to clear away any applications from their workspace, they may simply make a circular erasing, or cleaning, motion with their input device, thereby creating a clean, empty workspace. As an option, a size and/or speed by which the circular motion is carried out may affect the size and/or speed in which the pertinent portion of the graphical user interface is erased, respectively.

Figure 5:
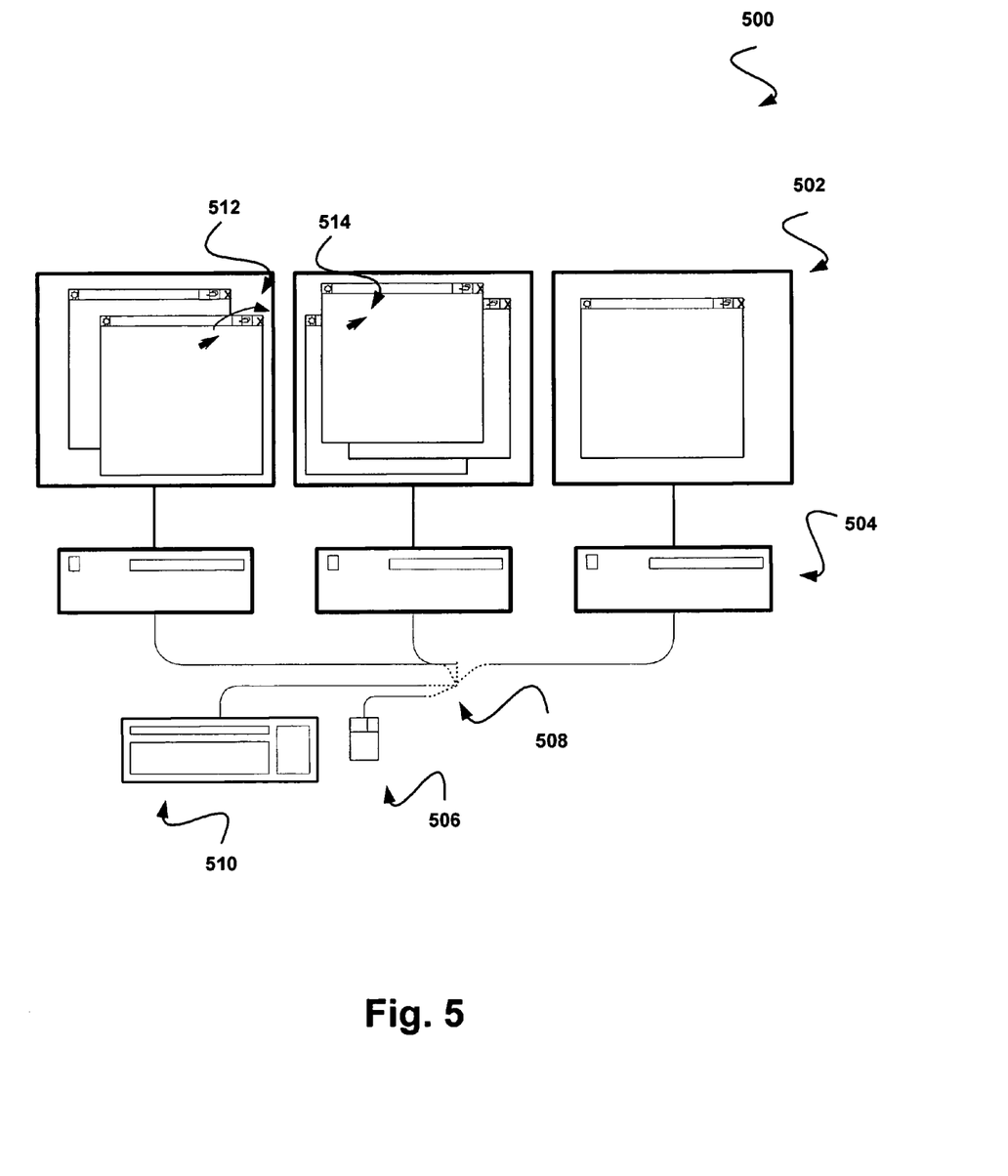
FIG. 5 shows another natural motion and reaction combination for utilizing natural motions of a user to move a cursor between screens, in accordance with another embodiment.

FIG. 5 shows another natural motion and reaction combination 500 for utilizing natural motions of a user to move a cursor between screens, in accordance with another embodiment. As an option, the present natural motion and reaction combination 500 may be implemented in the context of the architecture and functionality of FIGS. 1-3 or in any desired environment, for that matter.

In the present embodiment, the reaction is displayed on a graphical user interface associated with multiple displays 502, which are each driven by a corresponding computer 504. In such embodiment, a user may control a cursor on each of the displays 502 utilizing a single mouse 506 and keyboard 510. In use, the keyboard 510 or some other type of switch 508 may be used switch which display 502/computer 504 combination the single mouse 506 and keyboard 510 currently controls.

As shown, the natural motion may include a movement that addresses an edge of a graphical user interface. For example, a user may strike, bang, rub, etc. the cursor against the edge as shown in movement 512. To this end, the reaction may include automatically switching at least one aspect of the graphical user interface.

Specifically, in one embodiment, the reaction may involve a switch of which display 502/computer 504 combination the single mouse 506 and keyboard 510 currently controls. As shown in FIG. 5, this may involve the cursor moving to another one of the displays that is adjacent to the edge addressed. See movement 514. As an option, the foregoing reaction may be conditioned on a number of times the particular is addressed (e.g. >3 times), thereby providing a degree correlation between the natural motion and the reaction.

Similarly, in another embodiment including a single display system which is modeling a multi-display system (possibly using a remote connection), the aforementioned addressing of a particular edge of the graphical user interface may be used to switch to what would be the display adjacent such edge. In still other embodiments where the edge of the graphical user interface is addressed in the aforementioned manner, the cursor may be shown to stop moving once it reaches the edge of the display, however the user may keep moving the physical input device beyond the edge, thereby possibly expressing a degree of motion which may trigger an action that is not necessarily expressed by the cursor.

Additional unillustrated examples of natural motion and reaction combinations will now be set forth. Specifically, in one embodiment, the natural motion may include a shaking movement that addresses a portion of a graphical user interface that the user wants to enlarge. The reaction to such command includes enlarging the portion of the graphical user interface to which the shaking was applied. In one embodiment, both a size of the growth as well as the speed in which such growth takes place may be carried out as a function of an intensity of the shaking effected by the user.

In still yet another embodiment, the natural motion may include a pulling movement between a portion of a graphical user interface and a location on the graphical user interface. Such portion of the graphical user interface may involve an object (e.g. window, etc.). Thus, the reaction may include minimizing the portion of the graphical user interface at the location on the graphical user interface. For example, if a user wishes to minimize a window, such user may click on such window (in any place therein) and subsequently pull such window toward a task bar at a lower portion of the graphics user interface which may result in a minimization of such window as part of the task bar. In the present embodiment, a speed in which such minimization takes place may be carried out as a function of a speed of the pulling motion effected by the user, etc.

Various optional embodiments thus allow a user to use an input device in conjunction with natural motions to perform tasks which can be attributed to such motions. To this end, the user need not necessarily have to make abstractions about their tasks in relation to general user interface objects, but can instead perform actions that feel more familiar and natural. One possible result may include a user experience which is faster, more efficient, and more comfortable.

In various other embodiments, the use of natural motions in the foregoing manner may provide an easier way to teach computer tasks to disabled users, or users who are not comfortable with computers in general. In a similar vein, it may, in some embodiments, provide a more efficient way for advanced users to perform computer tasks.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
receiving an application-independent command from an input device utilizing at least one natural motion of a user with an associated degree;
in response to the application-independent command, displaying a reaction on a display in a manner that is intuitively correlated with the at least one natural motion, utilizing a graphics processor; and
wherein control logic controls the reaction;
wherein a degree of the reaction is a function of the degree of the at least one natural motion;
wherein training of the control logic is based on user input including at least one of sensitivity input, blacklist input, whitelist input, and input for correlating predetermined natural motions with predetermined reactions;
wherein the natural motion includes a shaking movement that addresses a portion of a graphical user interface, and the reaction includes enlarging the portion of the graphical user interface;
wherein both a size of the enlarging and a speed in which the enlarging takes place are a function of an intensity of the shaking movement.

2. The method as recited in claim 1, wherein the input device includes at least one of a trackball, a joystick, a touch window, a touch screen, a digitizing tablet, a touch pad, a head pointer, a mouse key, an eye gazer, and an eye tracker.

3. The method as recited in claim 1, wherein the at least one natural motion is manifested on the display utilizing a cursor.

4. The method as recited in claim 1, wherein the degree is associated with a parameter including at least one of the speed, length, the size, number, intensity, and smoothness.

5. The method as recited in claim 1, and further comprising evaluating the at least one natural motion.

6. The method as recited in claim 5, and further comprising determining whether the at least one natural motion successfully correlates with a command based on the evaluation.

7. The method as recited in claim 6, wherein the reaction is conditionally displayed based on the determination.

8. The method as recited in claim 5, and further comprising providing the user with feedback on the at least one natural motion.

9. The method as recited in claim 1, wherein the training is automatically performed by determining whether the user attempts to undo the reaction.

10. The method as recited in claim 1, wherein the reaction is displayed on the graphical user interface that is associated with multiple displays.

11. The method as recited in claim 1, wherein the reaction is displayed on the graphical user interface that is associated with an operating system.

12. The method as recited in claim 1, wherein the natural motion includes a circular movement indicative of an erasing function, and the reaction includes erasing a portion of the graphical user interface subject to the circular movement.

13. The method as recited in claim 1, wherein the natural motion includes a movement that addresses an edge of the graphical user interface, and the reaction includes switching at least one aspect of the graphical user interface.

14. The method as recited in claim 1, wherein the natural motion includes a pulling movement between a portion of the graphical user interface and a location on the graphical user interface, and the reaction includes minimizing the portion of the graphical user interface at the location on the graphical user interface.

15. A computer program product embodied on a computer readable medium, comprising:
computer code for receiving an application-independent command from an input device utilizing at least one natural motion of a user;
computer code for displaying a reaction on a display in a manner that is intuitively correlated with the at least one natural motion, in response to the application-independent command; and
wherein the computer program product is operable such that control logic controls the reaction;
wherein the computer program product is operable such that training of the control logic is based on user input including at least one of sensitivity input, blacklist input, whitelist input, and input for correlating predetermined natural motions with predetermined reactions;
wherein the natural motion includes a shaking movement that addresses a portion of a graphical user interface and the reaction includes enlarging the portion of the graphical user interface;
wherein both a size of the enlarging and a speed in which the enlarging takes place are a function of an intensity of the shaking movement.

16. A system, comprising:
a driver for receiving an application-independent command from an input device utilizing at least one natural motion of a user with an associated degree;

a graphics processor for displaying a reaction on a display in a manner that is intuitively correlated with the at least one natural motion, in response to the application-independent command; and wherein the system is operable such that control logic controls the reaction;

wherein the system is operable such that a degree of the reaction is a function of the degree of the at least one natural motion;

wherein the system is operable such that training of the control logic is based on user input including at least one of sensitivity input, blacklist input, whitelist input, and input for correlating predetermined natural motions with predetermined reactions;

wherein the natural motion includes a shaking movement that addresses a portion of a graphical user interface and the reaction includes enlarging the portion of the graphical user interface;

wherein both a size of the enlarging and a speed in which the enlarging takes place are a function of an intensity of the shaking movement.

17. The system as recited in claim 16, wherein the graphics processor is in communication with the display and a central processing unit via a bus.

* * * * *